United States Patent [19]

Hingorani

[11] 4,292,545

[45] Sep. 29, 1981

[54] METHOD AND MEANS FOR DAMPING SUBSYNCHRONOUS OSCILLATIONS AND DC OFFSET IN AN AC POWER SYSTEM

[75] Inventor: Narain G. Hingorani, Los Altos Hills, Calif.

[73] Assignee: Electric Power Research Institute, Inc., Palo Alto, Calif.

[21] Appl. No.: 59,994

[22] Filed: Jul. 23, 1979

Related U.S. Application Data

[63] Continuation-in-part of Ser. No. 30,691, Apr. 16, 1979.

[51] Int. Cl.³ .............................................. G05F 1/12
[52] U.S. Cl. .................................... 307/102; 323/210
[58] Field of Search .................... 307/102, 87, 51, 69, 307/73, 233 R, 271; 323/119, 120, 121, 124, 125, 126, 127, 128, 122, 123

[56] References Cited

U.S. PATENT DOCUMENTS

| | | | |
|---|---|---|---|
| 3,233,165 | 2/1966 | Bedford | 323/119 X |
| 3,551,799 | 12/1970 | Koppelmann | 323/128 X |
| 3,731,183 | 5/1973 | Johnson et al. | 323/108 X |
| 3,942,100 | 3/1976 | Käuferle et al. | 323/119 X |

Primary Examiner—L. T. Hix
Assistant Examiner—James L. Dwyer
Attorney, Agent, or Firm—Flehr, Hohbach, Test

[57] ABSTRACT

Subsynchronous oscillations and DC offset in an electrical power system are dampened by measuring the half-cycle period of current or voltage line waves, comparing the measured half-cycle time periods to a desired half-cycle time period and dissipating the line waves in measured half-cycle time periods which are longer than the desired half-cycle time period. Damping apparatus includes a reactance connected in a power line with selectively bi-directional conductors in parallel with the reactance whereby the reactance can be shorted. Alternatively, the selectively bi-directional conductors can connect a power line to ground or neutral when half-cycle time periods exceed a desired half-cycle time period.

12 Claims, 15 Drawing Figures

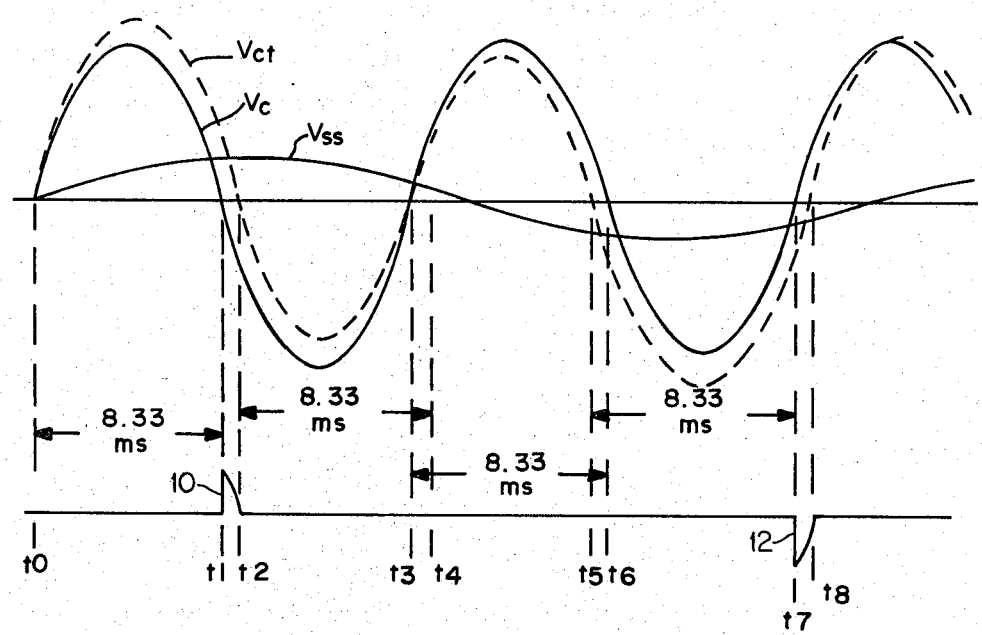
FIG.—1
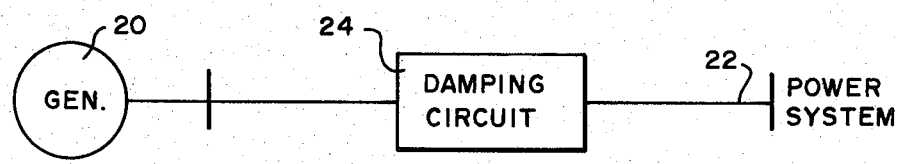
FIG.—2A
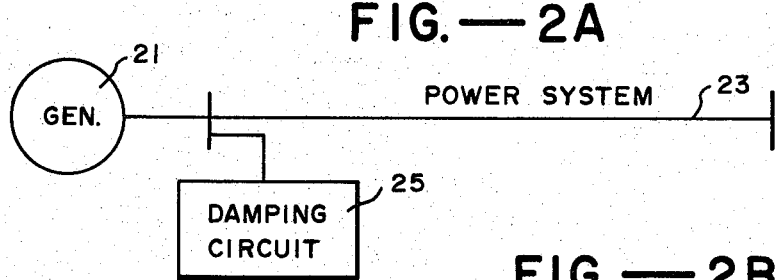
FIG.—2B
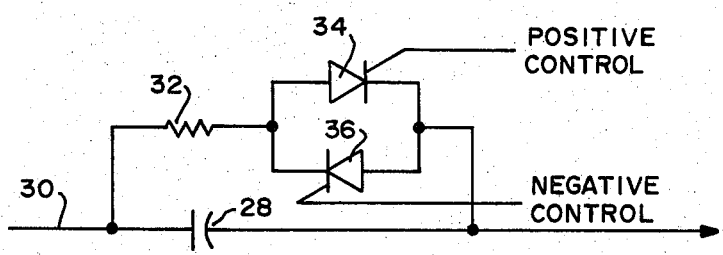
FIG.—3

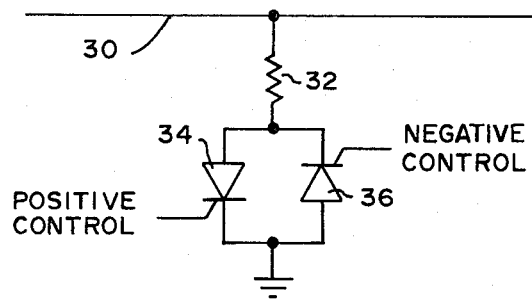
FIG.—4
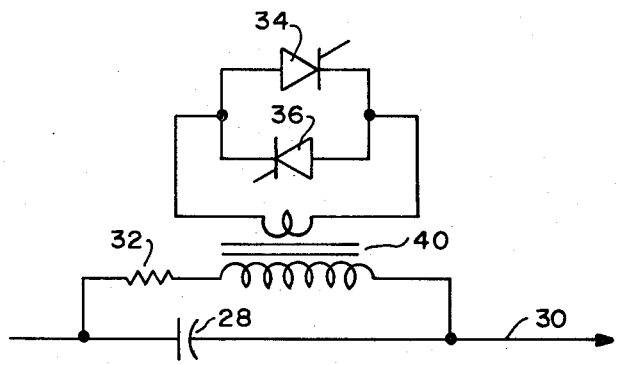
FIG.—5
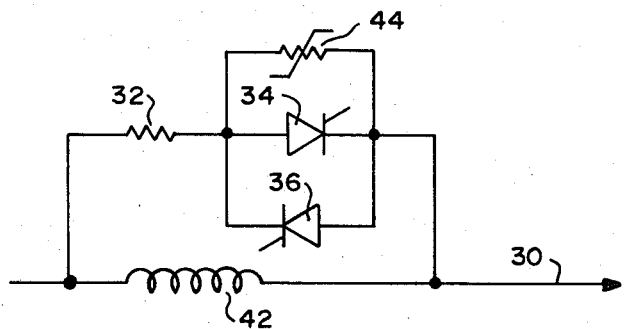
FIG.—6
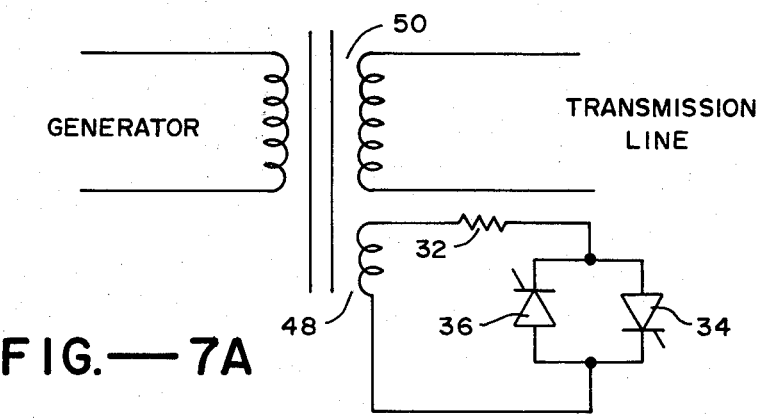
FIG.—7A

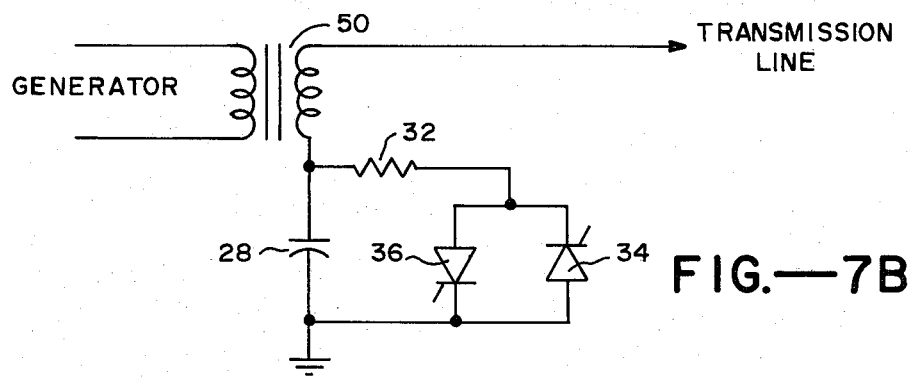
FIG.—7B
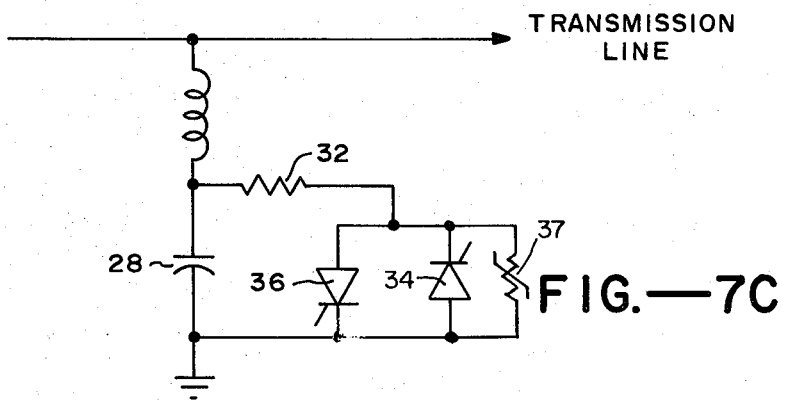
FIG.—7C
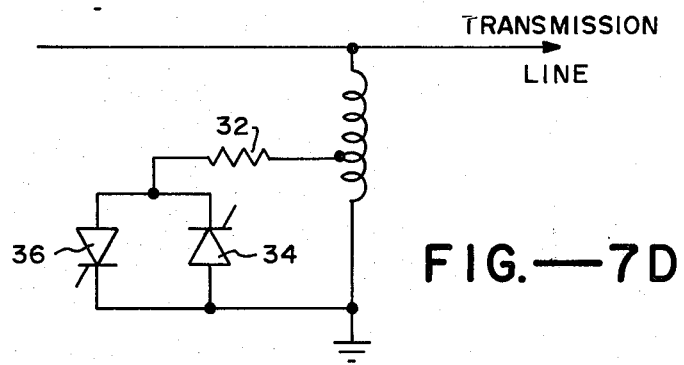
FIG.—7D
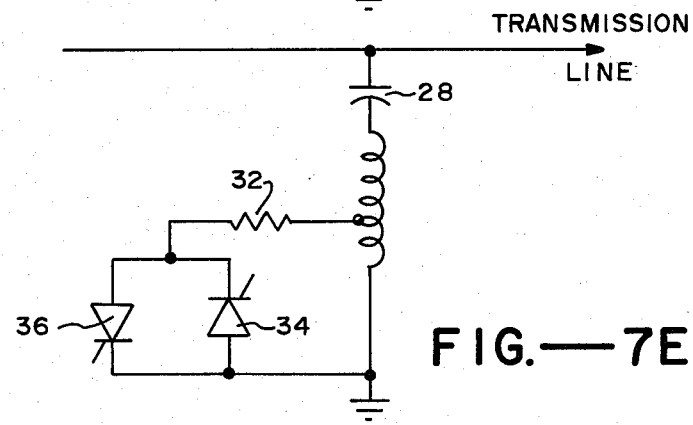
FIG.—7E

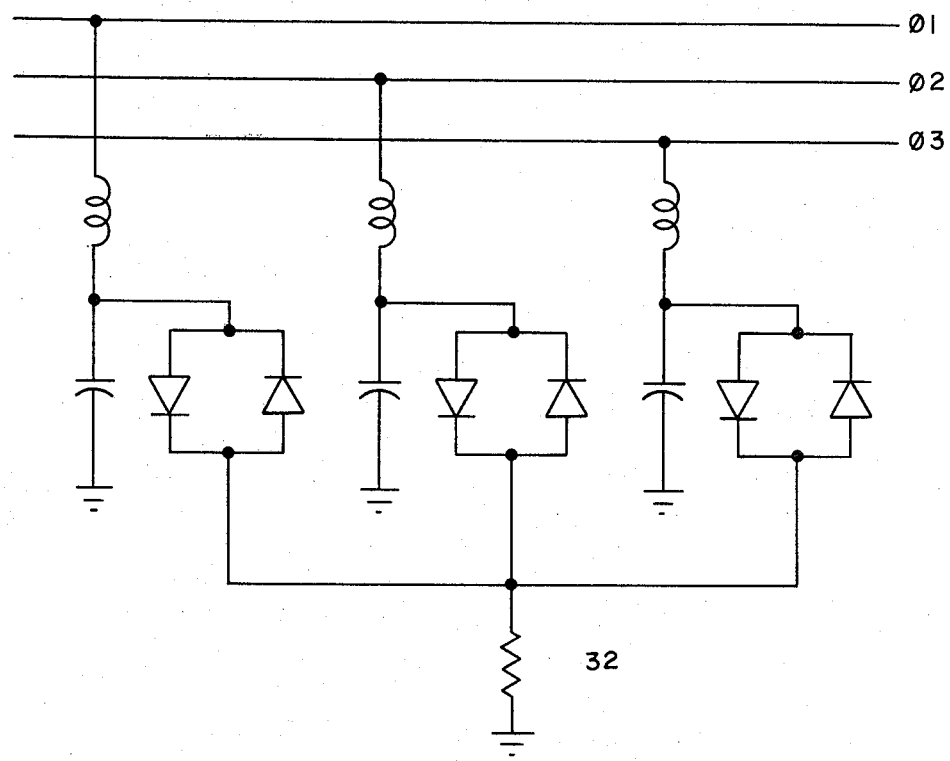
FIG.—7F

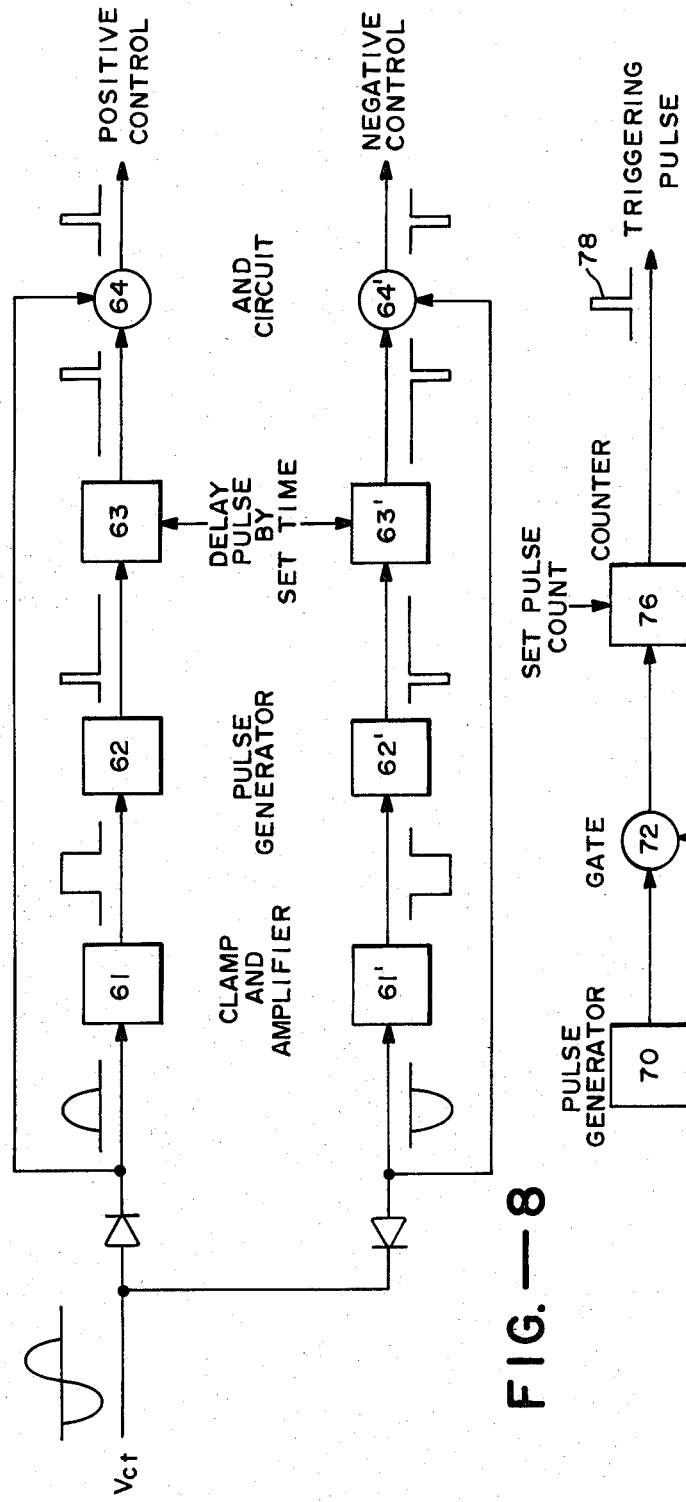
FIG.—8
FIG.—9

METHOD AND MEANS FOR DAMPING SUBSYNCHRONOUS OSCILLATIONS AND DC OFFSET IN AN AC POWER SYSTEM

This application is a continuation-in-part of co-pending application Ser. No. 030,691, filed Apr. 16, 1979.

This invention relates generally to electric power systems, and more particularly the invention relates to method and means for eliminating voltage and current subsynchronous oscillations and DC offset in AC power systems.

Alternating current (AC) electric power systems are normally operated at 50 Hz or 60 Hz. Since a plurality of power sources can be connected to a power system, and further since independent power systems are normally interconnected with one another for back-up power sharing purposes, the maintenance of an exact frequency for the current and voltage in the power system is imperative. Voltage and current oscillations at other frequencies can create serious problems of stability of the system and safety of equipment in the system. These oscillations can be started by small or large disturbances and become a problem when system damping is low or even regenerative at certain frequencies.

For example, when generators are connected to a power system or when two power systems are connected by transmission lines, oscillations in the frequency range of 0.1 Hz to 5 Hz may be present. Such oscillations cause system instability.

Further, when large turbine-generator units are connected to a power system through long series-compensated transmission lines, oscillations in the range of 10–50 Hz often occur due to interaction of mechanical oscillations of a long turbine-generator shaft and the electrical system. Such oscillations can damage the generator shaft even when the amplitude thereof is small.

Further, when a transmission line near a generating plant is disconnected to clear a fault, it is desirable to restore the line connection within a few cycles by high-speed reclosing of the breakers. This, in many applications, is not permitted because the oscillations of the machine started by the sudden change in load take a long time to decay, and mechanical oscillations caused by reclosure action could add to the earlier oscillations on the machines, and the resulting total torque and shaft twisting may exceed the acceptable limits. If, however, the oscillations could be made to damp more quickly, then faster reclosure of the disconnected line would be possible.

An object of the present invention is a method of damping subsynchronous oscillations and DC offset in AC power systems.

Another object of the invention is a method of dissipating energy in a power transmission line in half cycles of the line wave which are longer than a desired half cycle time period.

Still another object of the invention is apparatus for damping of subsynchronous oscillations and DC offset in AC electrical power systems.

Yet another object of the invention is apparatus for dissipating energy when measured half-cycle time periods of such waves exceed the desired half-cycle time period.

Briefly, in accordance with the present invention subsynchronous oscillations and DC offset are dampened in an AC electrical power system by measuring the half cycle periods of current or voltage line waves in the power system, comparing the measured half-cycle time periods to a desired half-cycle time period, and dissipating some energy during the measured half-cycle time periods which are longer than the desired half-cycle time period.

Damping apparatus in accordance with the invention may be either series connected or shunt connected in the power system. The series connected apparatus includes reactance means serially connected in a power line and circuit means connected in parallel with the reactance means including a resistor and serially connected selectively bi-directional conduction means. Means is provided for triggering the selectively bi-directional conduction means when half-cycle time periods of the voltage across the reactance means in the power line exceed a desired half-cycle time period.

In a shunt connected apparatus, circuit means is provided for connecting a power line to a circuit neutral terminal or ground including a resistive means and a serially connected selectively bi-directional conductive means. Means is provided for triggering the selectively bi-directional conduction means in response to half-cycle time periods of the voltage waves on said power line exceeding a desired half-cycle time period.

In either the series connected mode or the shunt connected mode, to the extent that any measured half-cycle exceeds the desired half-cycle time period, the selectively bi-directional conduction means tends to bring the measured half-cycle to a zero value, thus shortening the measured half-cycle.

In alternative embodiments, the selectively bi-directional conduction means may include a transformer including a primary winding connected in series with the resistor and with the secondary winding connected to selectively conductive means such as a pair of thyristors connected in parallel and in opposite polarity. Thus, the voltage across the bi-directional conduction means is reduced and current is increased, which may be a more economical approach for very high voltage systems.

These and other objects and features of the invention will be more readily apparent from the following detailed description and appended claims when taken with the drawings.

In the drawings,

FIG. 1 is a representation of voltage on a power transmission line including a desired voltage frequency and a subsynchronous oscillation.

FIGS. 2A and 2B are functional block diagrams of an electrical power system including damping apparatus in accordance with the invention.

FIG. 3 is an electrical schematic of one embodiment of damping apparatus in accordance with the invention.

FIG. 4 is an electrical schematic of another embodiment of damping apparatus in accordance with the invention.

FIG. 5 is an electrical schematic of another embodiment of damping apparatus in accordance with the invention.

FIG. 6 is an electrical schematic of still another embodiment of damping apparatus in accordance with the invention.

FIGS. 7A–7F are electrical schematics of other embodiments of damping apparatus in accordance with the invention.

FIG. 8 is a block diagram of a trigger circuit for use with damping apparatus in accordance with the invention.

FIG. 9 is a block diagram of an alternate trigger circuit for use with damping apparatus in accordance with the invention.

Referring now to the drawings, FIG. 1, by way of example, is a representation of the composite voltage wave, $V_{ct}$, in a power system transmission line including a desired 60 Hz component, $V_c$, and subsynchronous voltage component, $V_{ss}$. In this embodiment it is assumed that the subsynchronous component is at 27 Hz. However, as above indicated, the subsynchronous component may be from less than 1 Hz to as much as 50 Hz due to oscillations and perturbations within the system. Similarly, a DC offset in the transmission line can be dampened in accordance with the invention. The waveforms in FIG. 1 may represent the voltage across a capacitor serially installed in a transmission line, usually installed to compensate for line inductance.

In accordance with the invention, the zero voltage crossing point for the wave $V_{ct}$ is detected and the succeeding half cycle period of the wave is measured and compared with the desired half cycle time period. For a desired 60 Hz wave, the half-cycle time period is 8.33 milliseconds, as illustrated. When the measured half-cycle time period is greater than the desired half-cycle time period the composite voltage $V_{ct}$ is dissipated. The measured half-cycle may be either a positive voltage or a negative voltage. Thus, means must be provided to discharge either the excess positive voltage or the excess negative voltage of a measured half-cycle.

In FIG. 1, the first detected polarity transition of voltage $V_{ct}$ occurs at time $t_o$. After the desired half time period interval of 8.33 milliseconds, the wave polarity indicates that the wave half-cycle exceeds the desired half-cycle as the wave polarity has not changed during the measured 8.33 milliseconds. The excess wave voltage which is to be discharged is indicated by the curve 10 from the end of the first 8.33 millisecond time period, $t_1$ up to the time $t_2$ when the current in the discharging means comes to zero.

At time $t_2$ a second 8.33 millisecond time period is counted to the time $t_4$, and the polarity of the voltage $V_{ct}$ is again detected. In this instance the polarity of the voltage $V_{ct}$ has changed from negative to positive during the measured time period thus indicating that the period of this half-cycle of the wave is less than a desired half-cycle time period. Accordingly, no discharge of the wave occurs.

At the zero voltage point of the wave $V_{ct}$ at time $t_3$, another 8.33 millisecond interval is counted to time $t_6$, and the polarity of the wave is again detected. In this instance the wave has changed polarity from positive to negative in the time period $t_3$ to $t_6$ thus indicating that the wave half-cycle is less than the desired 60 Hz half-cycle. Again, no discharge of the wave occurs. At time $t_5$ when the voltage changes polarity another 8.33 millisecond time period is counted to time $t_7$, and the polarity of the voltage yet remains negative thus indicating that this half-cycle of the voltage is greater than the desired half-cycle. The excess voltage is indicated by the curve 12 between the time period $t_7$ and the time period $t_8$ when the line voltage again changes polarity.

Referring now to FIG. 2A a block diagram illustrates a generator 20 connected to a power system transmission system 22 through a series connected damping circuit 24 in accordance with the invention. The damping circuit may be near the point of connection of the generator or may be along the transmission lines. It is a common practice to provide series capacitor compensation at several locations along the line routes, and the damping circuit may be provided at one or more of these capacitor compensations. It is assumed that the power system transmission line carries voltage at 60 Hz, and the generator is generating a 60 Hz voltage with a spurious oscillation generating a subsynchronous frequency component, $\Delta$ Hz.

FIG. 2B is a block diagram illustrating a generator 21 connected to a power transmission system 23 and a shunt connected damping circuit 25 in accordance with another embodiment of the invention. The shunt damping circuit may be near the point of connection of the generator or may be along the transmission lines.

FIG. 3 is an electrical schematic of one embodiment of a series-connected apparatus for discharging excess voltage wave period of a series capacitor voltage thus damping the subsynchronous oscillations. Capacitor 28 is serially connected in the transmission line 30 as typically employed to compensate for line inductance. Discharging circuit means is connected in parallel with capacitor 28 for discharging the excess voltage wave periods and includes a resistor 32 serially connecting thyristor 34 and thyristor 36. The thyristors are connected in parallel and in opposite polarity whereby current flow through resistor 32 can be selectively controlled in either direction. When high voltage is involved the thyristor will be replaced by an assembly of thyristors which together act as a thyristor. It will be appreciated that the thyristors may be replaced by other controllable conductive devices such as a triggered vacuum tube, an ignitron, a power transistor switch, and like devices which can give controlled triggering in both directions. It will also be appreciated that two separate resistors may be provided one in series with each thyristor. Thyristor 34 is triggered conductive by a control signal when the excessive capacitor voltage half-cycle period is positive, and thyristor 36 is triggered by a control signal when the excessive capacitor voltage half-cycle is negative. In either case, after the larger half-cycle is detected, the corresponding thyristor is fired to discharge the capacitor through resistor 32 for the excess portion of its half-cycle voltage. This conduction causes capacitor 28 to discharge and accelerate the current zero of the capacitor voltage. The loss of energy in the resistor balances the capacitor charge and thereby provides positive damping for the subsynchronous oscillation. Conduction through the thyristor ceases when the current polarity changes.

In some applications, the set half-cycle period of the damping means may be fixed exactly at the half-cycle period of the desired frequency (this is $1/2 \times 60$ seconds = 8.33 milliseconds for the 60 Hz system and corresponding half-cycle period is $1/2 \times 50$ secs = 20 ms for the 50 Hz system). In some other applications, the set half-cycle period of the damping means may be fixed somewhat less than the half-cycle period of the desired frequency (for example, 8 ms for 60 Hz system). This would make the damping means continuously operating at low level energy dissipation and prevent a tendency of oscillations to slowly build up.

In the damping means, the set half-cycle time period for some other applications may be fixed somewhat greater than the half-cycle period of the desired frequency (for example 8.5 ms for 60 Hz system). This would cause the damping means to operate only during significant system disturbances.

In the damping means, the set half-cycle time period is automatically varied to suit the particular disturbance in the system. For example, during low frequency oscillations in the 0.1 to 5 Hz range, power flow would oscillate up and down in accordance with the oscillation frequency. This could be damped by decreasing the set half-cycle time period when the power flow is decreasing and vice versa.

In the damping means, the triggering of the selective bidirectional conduction is made voltage-dependent, such that the triggering is delayed beyond the set half-cycle period until the instantaneous voltage across the thyristor or the capacitor is below a set level. This set level may be fixed or may be made automatically variable to suit the particular disturbance in the system.

Application of the above features, including the automatic variation in the set half-cycle period, and maximum instantaneous voltage level, all these features collectively and/or individually are useful in optimizing both series-connected and shunt-connected damping with a minimum loss of energy in the resistor, and/or avoiding the possibility of the damping means amplifying oscillations at some other frequency than the ones intended to be damped by design.

FIG. 4 is an electrical schematic of an alternative damping circuit which is shunt-connected to the power system. In this embodiment the damping circuit including resistor 32 and thristors 34 and 36 are connected between the transmission line 30 and a system neutral terminal such as ground. The damping circuits operate in the same manner as the damping circuit of FIG. 3; however, in this embodiment the voltage on the transmission line is monitored rather than the voltage across the series capacitor. When a half-cycle of the line voltage is too large, the damping circuit is rendered conductive by applying the suitable trigger signal to either thyristor 34 or thyristor 36 depending on the polarity of the line voltage, and the excess voltage is shunted to ground through resistor 32. Thus, the line voltage half-cycles which are too long are forced toward zero level with consequent positive damping of the subsynchronous oscillation.

In EHV systems, a thyristor switch such as illustrated in FIGS. 3 and 4 would have to be designed for a high blocking voltage capability. To reduce the voltage requirements for the thyristor switch, and consequently the cost of the switch, a high to low voltage transformer may be included in the damping circuit as illustrated in FIG. 5. This embodiment is similar to the damping circuit of FIG. 3; however, the resistor 32 is serially connected with the primary winding of transformer 40 with the thyristors 34 and 36 connected to the secondary or low voltage winding of transformer 40. In an alternative embodiment, the resistor 32 also may be connected on the low voltage side of transformer 40 in series with thyristors 34 and 36, however, it is preferable to leave the resistor on the high voltage side so that when the transformer becomes saturated the resistor will limit current through the primary winding of the transformer. The transformer may be designed with saturation capability at a voltage above the acceptable capacitor voltage so that during large current flow through the capacitor (e.g. during a system fault), the transformer will saturate and discharge the capacitor.

FIG. 6 is an electrical schematic of another embodiment of a damping circuit in accordance with the invention in which the transmission line reactance is an inductor 42 rather than a capacitor. Further as illustrated in FIG. 6, a non-linear resistor 44 is provided in parallel with thyristors 34 and 36 to protect the thyristors from over-voltages. A non-linear resistor may be connected across the thyristors in other embodiments described herein, as will be appreciated by those skilled in the art.

FIGS. 7A-7F are electrical schematics of still other embodiments of the invention. Like elements have the same reference numerals in FIGS. 7A-7F. In FIG. 7A the damping circuit includes resistor 32 and thyristors 34 and 36 which are connected to a tertiary winding 48 in a system transformer 50 in which the transformer primary winding is connected to a generator or a power system and the transformer secondary winding is connected to the transmission line or a power system.

In the damping means, a small inductor may be placed in series with the resistor. This has the advantage of limiting the rate of rise and peak value of discharge current through the thyristor and in some applications enhancing the damping action.

FIG. 7B is an electrical schematic of another embodiment of the damping circuit in accordance with the invention in which capacitor 28 is serially connected in the transformer neutral and the discharging circuit means is connected in parallel with the capacitor.

FIG. 7C is an electrical schematic of another embodiment of the damping circuit in accordance with the invention, in which a capacitor 28 is serially connected with a shunt reactor and the discharging circuit means is connected in parallel with this capacitor. Shunt reactors are commonly installed in transmission systems of reactive compensation. A non-linear resistor 37 is connected in parallel with the thyristors 34, 36, as described above for FIG. 6.

FIG. 7D is an electrical schematic of another embodiment of a damping circuit in accordance with the invention in which the discharging circuit means is connected in parallel with a part of the shunt reactor.

FIG. 7E is an electrical schematic of another embodiment of a damping circuit, similar to that in FIG. 7D, except that capacitor 28 is inserted in series with the inductor.

Use of the damping circuits described above in a three phase power system will be readily apparent to those skilled in the art. For example, FIG. 7F is an electrical schematic of the damping circuit of FIG. 7C in a three phase system including phases $\phi 1$, $\phi 2$, and $\phi 3$. The circuit is modified whereby the damping circuits of each phase share the same resistive path through a single resistor 32 to ground, thus realizing an economy in circuit components. The other damping circuits described above can be used in three phase systems in a similar manner.

Generation of the trigger signals for controlling thyristors 34 and 36 may be implemented by numerous circuits which measure the voltage or current waveforms and compare the half-cycle waveforms to a desired half-cycle time period whereby a trigger pulse is generated when the measured half-cycle exceeds the desired half-cycle time period.

FIG. 8 is a block diagram of a suitable trigger circuit. Signal $V_{ct}$ proportional to the voltage $V_{ct}$ (FIG. 1) is rectified and each half-cycle is fed into identical circuitry for generating the control signals for the two switches 34 and 36, respectively (FIG. 3). The half wave is clamped and amplified in circuit 61 so that the output is a squarewave with step jump corresponding to the voltage zero of the input. This square wave is fed through the pulse generator 62, so that the output is a short pulse starting at the start of the square wave. This pulse is then fed through a delay circuit 63, which delays the pulse by a set time, such as 8.33 ms. This pulse is then sent through an AND gate 64 which lets the pulse through if the half wave input signal $V_{ct}$ is not zero. The pulse is then transmitted to the switch. The techniques of pulse transmission to a high voltage switch are well known. As above indicated the set time may be somewhat higher than 8.33 ms, such as 8.5 ms, for a 60 Hz system, or it may be somewhat lower than 8.33 ms. The set time itself could be controlled such that it can be increased if the thyristor conduction is to be delayed for certain conditions, or it can be decreased temporarily to increase the thyristor conduction time and therefore damping.

As above described, damping of subsyncrhonous oscillations and DC offset in an AC power system may be implemented in numerous embodiments in accordance with the present invention. In addition, during severe power disturbances some line voltage and current half waves may be much longer than the desired half-cycle in which case the thyristors may be stressed beyond their current ratings. In such cases, control logic can be incorporated in the trigger circuitry whereby the thyristor firing is delayed until the voltage and current drops below the thyristor maximum voltage and current rating. To accomplish this in FIG. 8, the AND gate 64 may be given an instantaneous voltage limit, so that the pulse is let through the AND gate if and when the half wave input signal $V_{ct}$ is less than a set value and not zero.

FIG. 9 is a block diagram of another suitable trigger circuit (shown only for one thyristor switch). It consists of a high frequency pulse generator 70, of sufficiently high frequency so that each pulse represents a small time period compared to the half-cycle period of the system. For example, for a pulse rate of 10 kHz, 83 pulses represent 8.3 ms. Pulses are allowed to pass through a gate 72 during positive half part of the waveform $V_{ct}$. The negative part of $V_{ct}$ is amplified by an amplifier/clamp 74 and used to block pulses through the gate during the negative parts of $V_{ct}$. Then a pulse counter 76 gives a pulse 78 after counting the number of pulses which represent the set half-cycle time period. This counter is reset to zero and stays continuously reset through the negative part of the wave $V_{ct}$. A similar circuit with corresponding wave input and polarity is provided for the other thyristor switch.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. The method of damping subsynchronous oscillations and DC offset in line waves in an AC power system including the steps of
    detecting polarity transitions and polarity of said line waves,
    counting the half-cycle time period of a desired frequency after a polarity transition,
    detecting polarity of said line wave at the end of each half-cycle time period, and
    dissipating energy at the end of each half-cycle time period when said detected line wave polarity has not changed during said time period.

2. The method as defined by claim 1 wherein said line wave is related to the current wave.

3. The method as defined by claim 1 wherein said line wave is related to the line voltage wave.

4. The method as defined by claim 1 and further including the step of extinguishing said dissipation of energy when said current passes through zero.

5. The method as defined by claim 4 wherein said half-cycle time period intervals are counted after each polarity transition of said line wave.

6. Apparatus for damping subsynchronous oscillations and DC current offset in an AC power line comprising
    reactance means serially connected in said power line,
    circuit means connected in parallel with said reactance means and including a resistor, a selectively bi-directional conduction means, and means connecting said selectively bi-directional conduction means with said resistor including a transformer having a primary winding and a secondary winding, said primary winding being serially connected with said resistor and said secondary winding being connected to said selectively bi-directional conduction means, and
    means for triggering said selectively bi-directional conduction means in response to half-cycle time period of voltage across said reactance means exceeding a preselected time period.

7. Apparatus as defined by claim 6 wherein said transformer includes a magnetically saturable core.

8. Apparatus for damping subsynchronous oscillations in DC voltage offset in an AC power line comprising
    a power transformer including a primary winding and a secondary winding,
    means connecting said primary winding to electrical power means,
    means connecting said secondary winding to a power transmission line,
    a tertiary winding magnetically coupled to said primary winding,
    circuit means connected to said tertiary winding including a resistor and a serially connected selectively bi-directional conduction means, and
    means for triggering said selectively bi-directional conduction means in response to half-cycle time periods of line waves on said power transmission line exceeding a preselected time period.

9. Apparatus as defined by claim 8 wherein said selectively bi-directional conduction means comprises first and second thyristors connected in parallel and in opposite polarity.

10. Apparatus as defined by claim 9 wherein said means for triggering applies a trigger pulse to one of said thyristors whereby current flows unidirectionally through said circuit means.

11. Apparatus as defined by claim 10 wherein said means for triggering comprises a pulse generator for generating said trigger pulse in response to a zero crossing of a line wave and delay means for delaying application of said trigger pulse for said preselected time period.

12. Apparatus as defined by claim 10 wherein said means for triggering comprises a high frequency pulse generator, pulse counter means, said pulse counter means generating a trigger pulse upon reaching a preselected count, gate means connecting said pulse generator to said pulse counter means, and means responsive to said line wave for controlling said gate means and for resetting said counter means.

* * * * *